Patented Nov. 27, 1951

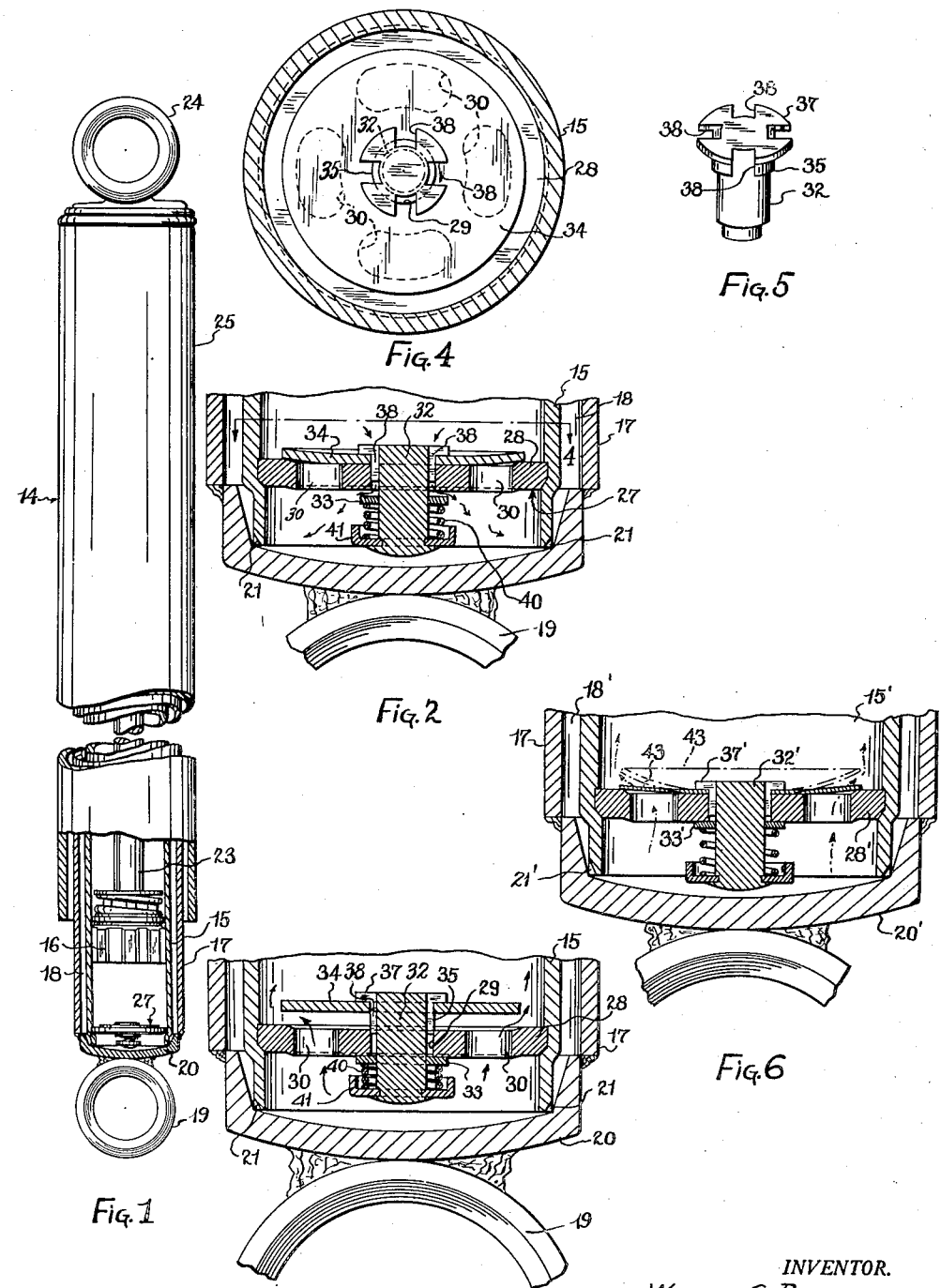

2,576,637

UNITED STATES PATENT OFFICE 2,576,637

VALVE FOR SHOCK ABSORBERS

William G. Patriquin, Cleveland, Ohio, assignor to The Gabriel Company, Cleveland, Ohio, a corporation of Ohio Application January 29, 1949, Serial No. 73,618

3 Claims. (Cl. 277—61)

The present invention relates to hydraulic shock absorbers of the direct double acting tubular type, and more particularly to an impact and replenishing valve structure for this type of shock absorbers.

Direct double acting tubular shock absorbers utilized on automotive vehicles having spring suspended frames usually comprise a cylinder attached to the axle of the vehicle and a piston in the cylinder which is connected with the frame so that when the wheels of the vehicle pass over a rough surface the piston and/or the cylinder move relative to one another. The cylinder contains a suitable oil which is expelled from one end of the cylinder into a reservoir when the axle and frame move toward one another, relatively. This action is referred to as the "impact" stroke of the shock absorber and in many instances it is desirable to restrict the flow of fluid from the cylinder on the impact stroke for restraining the normal compression of the vehicle springs. When the cylinder and piston move in the opposite direction after "impact," i. e., on "recoil" it is desirable to cause the oil to freely re-enter the cylinder so that the tendency of the piston to create a vacuum in the cylinder is obviated by the relatively free re-entrance of the oil into the cylinder.

The present invention is directed to a valve structure to be employed in the cylinder to control the passage of the oil from and to the cylinder on the impact and recoil movements of the shock absorber respectively, and an object of the invention is to provide a valve structure restricting the flow of fluid from the cylinder on impact and affording relatively free passage of the fluid to replenish the cylinder on recoil.

Another object of the invention is to provide a valve structure of the character referred to in the preceding paragraph consisting of a minimum of parts which may be inexpensively manufactured and assembled.

Other objects and advantages of the invention will be apparent from the following description of two preferred forms of the invention, reference being made to the accompanying drawings wherein:

Fig. 1 is a view, partly in section, of a direct double acting hydraulic shock absorber suitable for use on an automotive vehicle;

Fig. 2 is a fragmentary view in section and on a larger scale showing one form of impact and replenishing valve structure for shock absorber shown in Fig. 1, the parts of the valve structure being shown in the positions assumed during the impact stroke of the shock absorber;

Fig. 3 is a view similar to Fig. 2 but showing parts of valve structure in the positions assumed during the recoil stroke of the shock absorber;

Fig. 4 is a view taken on line 4—4 of Fig. 2;

Fig. 5 is a perspective view of a valve supporting member of the valve structure; and Fig. 6 is a view similar to Fig. 3 but showing a different form of valve structure.

Referring to the drawing, for the purpose of illustrating preferred embodiments of the invention, I have shown a shock absorber 14 which may be similar in general construction to well-known types of direct double action shock absorbers such as that described in U. S. Patent #2,396,227, for example except for the impact and replenishing valve structure. The shock absorber 14 comprises a cylinder 15 in which a piston 16 is adapted to reciprocate, the term "reciprocate" also includes movement of the cylinder on the piston. The cylinder 15 is mounted concentrically within a cylinder 17 and spaced therefrom to form an oil reservoir 18 intermediate the cylinders. The two cylinders are suitably connected at their lower ends to a common end cap 20, and a plurality of grooves 21 are formed in the lower end edges of the cylinder 15 for providing oil passages between the cylinder and the reservoir 18. The end cap 20 is provided with the usual ring 19 by which one end of the absorber may be attached to the axle of the vehicle, for example. The upper ends of the cylinders 15 and 17 have the usual construction, (not shown) for reception of a piston rod 23 which is connected at one end to the piston 16 and the opposite end of which is connected to a ring structure 24. The ring 24 may be suitably attached to the frame of the vehicle as is well understood in the art. An outer cylindrical casing 25 is attached to the ring structure 24 and it surrounds the cylinders 15 and 17 and provides a shield therefor, it being understood that the cylinders are adapted to telescope within the casing during movement between the cylinders and the piston.

Referring to Figs. 2 through 4, an impact and replenishing valve structure indicated generally at 27, is mounted in the lower end of the cylinder 15 and this structure is adapted to control the flow of oil between the cylinder 15 and the reservoir 18 so that as the oil between the valve structure and the piston 16 is acted upon during impact movement of the shock absorber the valve restricts the flow of oil to the reservoir but on the reverse movement or recoil the oil flow back into the cylinder is relatively unrestricted.

The valve structure 27 comprises the usual closure plate 28 which is adapted to be crimped against an annular shoulder in the lower end of the cylinder 15 with the peripheral edges in substantially sealing engagement with the walls of the cylinder. The closure plate is dished and it is provided with a central circular opening 29 and relatively large openings 30, preferably four in number, which latter openings are spaced about the central opening and within the raised rim portion of the plate. A pin-like valve supporting member 32 is adapted to extend through the central opening 29 and to support circular valve plates 33 and 34 at the bottom and top sides of the closure plate, respectively. A portion 35 of the member 32 is adapted to closely fit the walls of the opening 29 to guide the member in the opening and the diameter of the remainder of the member is reduced to permit passage of oil between the walls of the opening and the member. The upper end of the member 32, as viewed in Fig. 5, has a circular flange formation 37 formed thereon for retaining the valve plate 34 between the flange and the closure plate 28, the valve plate having a central opening through which member 32 extends. The valve plate may be mounted so that it can slide on the portion 35 of the member 32. Oil passageways are provided along the sides of the member 32 by slots 38 which are preferably milled in the flange 37 and longitudinally of the portion 35, and the depth of the slots are preferably equal to the difference in radii of the two main portions of the member 32. The slots 38 and the space between member 32 and the walls of the opening 29 form an oil passageway from above the valve plate 34, when the latter is against plate 28, and through the plate 28, and which passage is of considerably less cross sectional area than the total areas of the openings 30.

The valve plate 33 is preferably formed of relatively rigid material such as fiber, metal or plastic for example, and it has a central opening through which the member 32 extends. The plate 33 is adapted to reciprocate on the member 32 and, as may be seen by reference to Fig. 3, it is adapted to close only the opening 29 through the closure plate. Preferably, a coil spring 40 is adapted to normally maintain the valve plate 33 against the closure plate 28 and over the opening 29 and this spring is held in tension by a cup 41 secured to the lower end of the member 32. However, the valve plate may be forced away from the opening by oil pressure in the cylinder resulting from a shock impact as is illustrated in Fig. 2 wherein the arrows indicate the path of travel of the oil expelled from the cylinder 15.

The valve plate 34 is preferably formed of a suitable rigid material which may be similar to that of valve 33 and it is of such diameter that it extends over the four openings 30. The reaction of spring 40 against valve plate 33 and the cup 41 causes the member 32 to normally retain the valve plate 34 against plate 28 to close the openings 30, as is shown in Fig. 2. When the shock absorber recoils from an impact, however, the tendency of the piston to create a vacuum reduces the pressure between the piston and the valve plate 34 and the latter moves from the plate 28 carrying the member 32 upwardly contra to the reaction of the spring 40. This movement of the valve plate 34 uncovers the openings 30 and permits relatively unrestricted passage of the oil therethrough and into the cylinder 15 between the piston and closure plate as is indicated by the arrows in Fig. 3.

By referring to the arrows in Figs. 2 and 3, it will be seen that on the impact stroke the valve plate 34 closes openings 30 and the oil expelled from the cylinder passes therefrom through the relatively restricted openings formed by slots 38. On the recoil stroke, however, valve plate 34 opens the relatively large openings 30 so that the cylinder may be quickly replenished by a relatively heavy volume of fluid.

In the embodiment of the invention shown in Figs. 2 and 3 the valve plate 34 is preferably formed of a suitable material which is relatively rigid and requires the reciprocation of the member 32 in the opening 29 for operation of the valve. In Fig. 6 I have shown another form of valve which, with the exception of the valve plate 34, is similar to the valve 27 and similar parts are designated by the same reference numerals having a prime suffixed thereto. In the valve shown in Fig. 6, plate 34 is replaced by a plate 43 which is formed of a relatively thin flexible disk which may be of any suitable material, such as metal, fiber or plastic, for example and which is adapted to flex upwardly, as shown in the broken lines of Fig. 6, on the replenishing stroke of the piston 16'. Upon the impact stroke of the piston however, the plate 43 will maintain the openings 30' closed and thereby cause the oil to pass through the slots 38' and opening 29'.

It will be seen from the foregoing description that an impact and replenishing valve is provided which lends itself to economical manufacture and which will be efficient and dependable in its operation.

Although I have described but two forms of the invention it is to be understood that other forms might be adopted all coming within the scope of the claims which follow.

Having thus described my invention, I claim:

1. In a valve structure, a fixed closure plate having a plurality of openings therethrough, a movable supporting member extending through one of said openings and projecting beyond the opposite faces of said closure plate and provided on one end with a head portion and on its opposite end with a spring abutment, a valve plate movably mounted on said supporting member for closing said one opening, a spring mounted on said supporting member and abutting said valve plate and said spring abutment and normally urging said valve plate against the closure plate to close said one opening, a second valve plate mounted on said supporting member on the opposite side of the closure plate with respect to the first mentioned valve plate and normally closing the other of said openings in the closure plate, said head portion of the supporting member overlying said second valve plate, and cooperating means on said head portion of said supporting member and said second valve plate forming fluid passageways communicating with said one opening.

2. In a valve structure as defined in claim 1 and wherein said second valve plate is flexible and may flex relative to said supporting member and away from said fixed closure plate to open said other openings.

3. In a valve structure as defined in claim 1 and wherein said supporting member has a guiding portion adjacent the head portion thereof and cooperating with the wall of said one opening for guiding the member for reciprocation in said one opening, said guiding portion having a channel extending longitudinally thereof and forming a passage and communicating with said cooperating means on said head portion and said second named valve plate, said second named valve plate being rigid and mounted on said guiding portion of said supporting member, said spring also acting to urge said supporting member in a direction wherein the head portion of the latter acts to seat the second valve plate on said closure plate in addition to said spring acting to seat said first valve plate against said closure plate.

WILLIAM G. PATRIQUIN.

REFERENCES CITED

The following references are of record in the file of this patent:

UNITED STATES PATENTS

| Number | Name | Date |
|---|---|---|
| 1,983,064 | Bates | Dec. 4, 1934 |
| 1,990,516 | Beckel | Feb. 12, 1935 |
| 2,159,289 | Nickelsen | May 23, 1939 |
| 2,360,755 | Boor | Oct. 17, 1944 |
| 2,379,750 | Rossman | July 3, 1945 |